H. S. WHEELER.

BUILDING AND PAVING BLOCK.

APPLICATION FILED SEPT. 20, 1919.

Reissued June 29, 1920.

14,904.

Inventor.
Harold S. Wheeler.

by F. J. Fisher
his Atty.

UNITED STATES PATENT OFFICE.

HAROLD S. WHEELER, OF TACOMA, WASHINGTON.

BUILDING AND PAVING BLOCK.

14,904. Specification of Reissued Letters Patent. Reissued June 29, 1920.

Original No. 1,244,608, dated October 23, 1917, Serial No. 100,951, filed May 31, 1916. Application for reissue filed September 20, 1919. Serial No. 325,253.

*To all whom it may concern:*

Be it known that I, HAROLD S. WHEELER, a citizen of the United States, residing at Tacoma, in the county of Pierce, State of Washington, have invented certain new and useful Improvements in Building and Paving Blocks, of which the following is a specification.

This invention relates to building blocks formed of plastic or cast material, such as clay or concrete. The objects of my invention are to provide an improved form of interlocking or keyed blocks, giving a new effect and result highly desirable in both wall and road paving construction.

When my improved block is used for wall building, the interlocking feature will effectively hold the blocks against displacement by a side thrust against the wall as will be apparent from a study of the accompanying drawing, and the description hereinafter given.

And when my improved block is used for road building said interlocking feature will function to distribute the wheel-load vertically over a larger surface of the base then the bearing surface of the block to which the load is applied, and which will carry the horizontal thrusts of the road-arch to the curbing; in which the ends are formed so as to facilitate the laying of straight or curved roadways. The blocks may be made either solid or hollow, and if made hollow, will drain the road effectively. The blocks can be used either as a complete pavement by themselves, or may have a concrete or other base, or may be used as a base for a different wearing surface.

It will suffice to illustrate the attainment of the new effect and results referred to by showing the practical application of my new interlocking block for road building, since the wall construction obtained by the use of the same block will be apparent by simply turning said drawing so that the supporting base will be relatively moved into a plane, perpendicular to that of the horizontal road base.

In the accompanying drawing.

Figure 1:
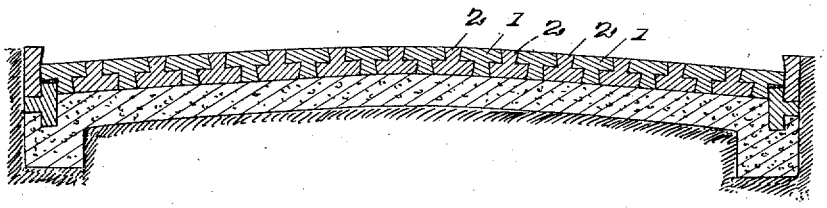
Figure 1 is a cross-section of a road pavement formed of my block.

Each block consists of two main parts, the broad head 1 and the narrower tongue 2. The tongue 2 extends from end to end of the head 1, along its center, and may conveniently be made substantially one-fourth the width of the said head 1, though in blocks for some purposes the tongue is made only a little narrower from the head. The outer surfaces 3 and 4, respectively, of the head and tongue form the wearing or exposed surface of the structure and in general lie in parallel planes. The two ends 5 and 6 of the blocks are cut vertically but are preferably not parallel, the block being shorter on one side than on the other, so that the transverse joints between blocks are inclined at less than a right-angle to the line of the road. In the drawings these ends lie at an angle of about two degrees with each other. The side surfaces 7 of the head 1 are not vertical or in parallel planes but are equally divergent downward from the head surface 3 toward the tongue 2, but their edges are parallel, that is to say the heads are of uniform width. The sides 8 of the tongue 2 each lie in planes parallel with the respective sides 7 of the head. In the drawings, the sides 7 and 8 make about five degrees with the vertical. The undercut surfaces 9, adjacent the tongue and joining the side surfaces 7 and 8 on each side of the block, are not parallel with the wearing surfaces 3 and 4 but are equally inclined upward so as to lie substantially at right-angles with the side surfaces on the other sides of the block, respectively. Thus, in the drawings, the surfaces 9 make an angle of about five degrees with the horizontal (toward the center of the surface 3) and about eighty degrees with the adjacent parallel sides 7 and 8. Thus it will be seen that each block is keyed with each adjacent block so that when the wheel-load comes on the face 3 of the head 1 it is transmitted to the four inverted blocks in contact therewith through the undercut surfaces 9 and simultaneously tends to draw all said blocks together, while if the wheel-load comes on the face 4 of the tongue 2, it is carried by the inclined surfaces 7 and 8 to the adjacent blocks.

Figure 2:
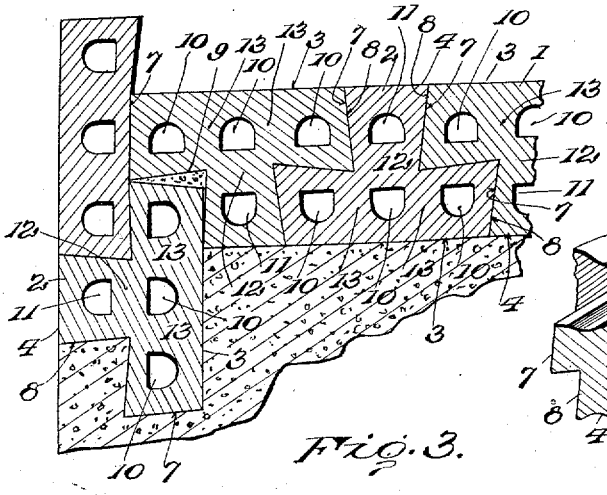
Fig. 2 is a section showing that portion thereof adjacent the curbing.

For some purposes I prefer to make the blocks hollow by providing series of holes therein, which holes can be arranged in various ways, as for example that shown in Fig. 2, in which three longitudinal holes 10 extend from end to end of the block, through the head 1, and one similar inverted hole 11 is in the tongue 2, said holes being positioned so that the central hole 10 and the hole 11 are vertically in line and so that the side hole 10 of one block is vertically over the side hole 10 of the interlocked adjacent block, and so that the holes 10 and 11 in interlocked adjacent blocks lie in the same horizontal planes.

This arrangement of the holes 10 and 11 develops a horizontal intermediate thrust wall 12 throughout the entire structure, leading to the two sides thereof and midway between the two wearing surfaces 3 and 4; and bearing webs 13 between the central hole 10 and each side hole 10. It will be noted that the webs forming the sides 7 and 8 adjacent each other in the structure together are of the same size and vertically in line with the bearing web 13 above or below the said joint, and that the webs forming the adjacent undercut sides 9 of two blocks together are of the same size and horizontally in line with the intermediate thrust web 12. These holes 10 and 11 all connect together in adjacent blocks thus forming a set of continuous conduits running lengthwise of the roadway, and these conduits may, at suitable intervals, be connected to a cross drain below their level in the usual way, thus effectively draining the roadway at all points in its surface.

Figure 4:
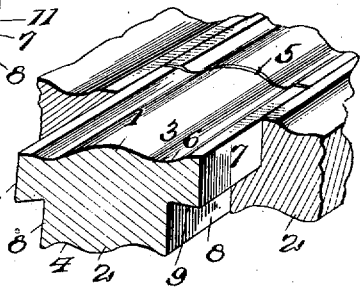
Fig. 4 is a perspective view showing the corrugated form of my block.
Figure 3:
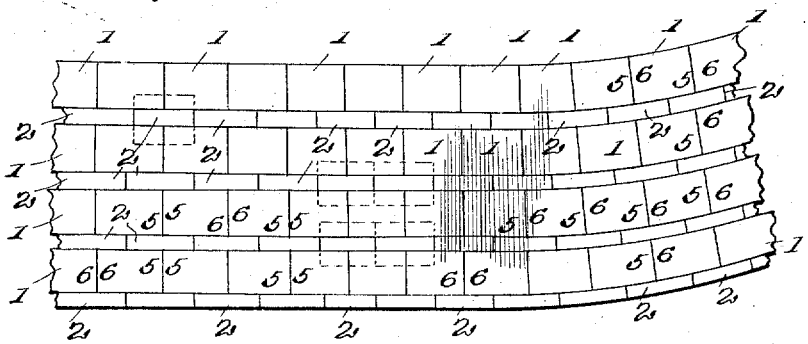
Fig. 3 is a plan of a portion of such a road showing a straight and a curved portion therein.

The surfaces 3 and 4 may be flat, with a smooth finish, or roughened, or may be slightly corrugated, as shown in Fig. 4. When they are made corrugated they will be especially adapted for roads which are largely used by motor vehicles, since they will lie parallel with the roadway and will therefore resist skidding and will tend to keep the vehicle on a straight path. Such corrugations will also give a larger bearing surface for pneumatic tired vehicles and will therefore tend to prolong the life of the tires and of the blocks, and the under surfaces, being also corrugated, will grip the base more effectively.

Since the ends 5 and 6 are cut at an angle to each other it is evident that when laying a straight roadway the blocks must be reversed so that the ends 5 of one block will contact with the end 5 of the next adjacent block and so that the ends 6 of two adjacent blocks will contact with each other; and that when laying a curved roadway they will all be laid with their short sides toward the center of the curve so that all the transverse edges will be substantially radial from said center, the end 5 of each block contacting with the edge 6 of the adjacent block.

As obvious from an inspection of Fig. 2 of the drawing, the interlocking feature above described, functions equally as efficiently in the use of my blocks for wall and floor building, and such use is not only suggested but is clearly shown by merely turning said drawing on its side as above mentioned; and the same new result which is attained in the use of my block for road building, is also attained in the use of my block for wall building, and like purposes.

In other words, supposing my blocks to have been built into a wall, it is obvious to any one skilled in the art of wall construction that the wall so produced will have maximum strength for load-carrying purposes even though the blocks be made hollow, that is, the voids as above described, because all carrying webs will be substantially in vertical alinement. At the same time the wall will effectively resist any side thrust, for when pressure is brought to bear against the face 2 of the tongue of a block, a double wedge action will result, due to the inclined faces 7 of the head bearing on the inclined faces 8 of the tongue; and likewise, in case of a side thrust against the face 3 of the head of the block, the inclined surfaces 9 on the inner faces of the head of the block adjacent the tongue will tend to pull the block above and the block below into closer relation instead of tending to push them outward.

Hence the interlocking resulting from the particular construction of said bearing faces renders it impossible to overturn any block in the wall without first displacing it and throwing it out of the line of the wall. In short, the blocks are not only effectively interlocked with each other, but any side thrust tends to promote the interlocking relation rather than disturb it. This feature is the most important result obtained by my improved block, and as mentioned, is present to the same degree whether said blocks be used for building a wall or a paving for a road.

What I claim is:

1. A paving block comprising a head, having a bearing surface; and a tongue, extending centrally from end to end of the head and narrower than said head; the faces of said head adjacent the tongue being inclined toward the central line of said bearing surface.

2. A paving block comprising a head, having a bearing surface and sides, said sides being inclined outward from said bearing surface; and a tongue, extending centrally from end to end of said head and having a bearing surface parallel with the bearing surface of the head, and having sides, each such side being substantially parallel with the inclined side of the same side of the head; the faces of said head adjacent the tongue each being inclined from its outer edge toward the central line of the bearing surface of the head.

3. A paving block comprising a broad head having a bearing surface and a narrow tongue having an inverted bearing surface, and having a plurality of voids in the head and a single void in the tongue, the single void in the tongue being in corresponding inverted position to the voids in the head, whereby when adjacent blocks are placed in complementary positions the voids in the tongues aline with the voids in the heads to form an upper and a lower row of voids and whereby the contiguous horizontal thrust webs thus formed between said two rows of voids extend in arched alinement across the road.

4. A paving block comprising a broad head having a bearing surface and a narrow tongue having an inverted bearing surface, and having a row of three voids in the head and a single void in the tongue, the single void in the tongue being vertically below the central void in the head, and the side voids in the head being positioned centrally between the side of the head and of the tongue whereby, when a series of such blocks are placed in complementary positions side by side, the vertical webs separating the adjacent voids in the two layers are each in vertical alinement and are composed of a single wide integral web in the head portion and of two narrow complementary webs, each of substantially one-half the thickness of said wide web, formed by the adjacent sides of the head and tongue of adjacent blocks.

5. A roadway pavement composed of hollow blocks laid in courses running parallel with the axis of the road, said courses being side by side across the road, each course comprising blocks having two layers of voids and laid with relation to similar blocks in the next course as described, so that the layers of voids in each course are in alinement with the layers of voids in the adjacent courses and the horizontal webs are in arched alinement across the roadway.

6. A roadway pavement composed of similar hollow blocks laid in courses running parallel with the axis of the road, alternate courses being formed of blocks laid in inverted position, each course comprising blocks having a head with one wearing surface and a tongue with an inverted wearing surface, the sides of the head being inclined outward from the wearing surface, and the sides of the tongue being parallel to the sides of said head, and the faces of said head adjacent the tongue each being inclined from its outer edge toward the central line of the wearing surface of the head.

7. A building block comprising a head having a central tongue and lateral projecting portions, the adjacent surfaces of both the tongue and said lateral projecting portions forming acute angles with the outer surface of said head and with one another, and the end surfaces of said lateral portions being inclined outward toward the tongue, substantially as described.

8. A structure built of blocks, each block comprising a head having a central tongue and lateral projecting portions, the adjacent surfaces of both the tongue and said lateral projecting portions forming acute angles with the outer surface of said head and with one another, and the end surfaces of said lateral portions being inclined outward toward the tongue, one end of the head of one block being seated in the recess formed by the tongue with the head of the contiguous block, whereby said blocks are interlocked with one another, substantially as described.

HAROLD S. WHEELER.